(12) United States Patent
Mores

(10) Patent No.: US 6,519,720 B1
(45) Date of Patent: Feb. 11, 2003

(54) DATA TRANSMISSION SYSTEM

(75) Inventor: Robert Mores, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/423,570

(22) PCT Filed: Mar. 2, 1999

(86) PCT No.: PCT/IB99/00347

§ 371 (c)(1),
(2), (4) Date: Nov. 9, 1999

(87) PCT Pub. No.: WO99/46888

PCT Pub. Date: Sep. 16, 1999

(30) Foreign Application Priority Data

Mar. 10, 1998 (DE) .......................................... 198 10 235

(51) Int. Cl.[7] ................................................ G06F 11/14
(52) U.S. Cl. ................................. 714/43; 714/3; 714/7; 714/22; 714/56; 714/14; 700/20; 700/22; 701/3; 701/19; 701/21; 701/22; 701/36; 701/45; 713/323; 713/300; 713/330

(58) Field of Search ........................ 700/20, 22; 701/3, 701/19, 21, 22, 36, 45; 713/323, 300, 330, 324; 714/22, 43, 49, 3, 7–9, 14, 38, 56

(56) References Cited

U.S. PATENT DOCUMENTS 5,892,893 A * 4/1999 Hanf et al. ..................... 713/3
6,115,831 A * 9/2000 Hanf et al. .................... 714/43
6,148,409 A * 11/2000 Mores ......................... 713/330

* cited by examiner

*Primary Examiner*—Thomas Black
*Assistant Examiner*—Luke T. Huynh
(74) *Attorney, Agent, or Firm*—Steven R. Biren

(57) ABSTRACT

A sub-net operation with increased availability and reduced power consumption is achieved in a bus system with a plurality of stations (10, 11, 12) which are coupled to one another via a system of conductors (13, 14). Each of the stations includes a transceiver (21) and a control unit (30). The stations are switched from a quiescent state to a standby state in response to the reception of a first wake-up signal and selected stations are switched to a normal operating state upon reception of a second wake-up signal, whereby stations are selected.

26 Claims, 2 Drawing Sheets

DATA TRANSMISSION SYSTEM

BACKGROUND OF THE INVENTION

The invention relates to a bus system with a plurality of stations which are coupled to one another via a system of conductors and each of which includes a transceiver and a control unit.

Systems of this kind are used mainly in vehicles. Vehicles must remain operational also after having been parked for weeks and hence are subject to severe quiescent current conditions. Contemporary Vehicles contain increasing amounts of entertainment, comfort and communication electronics which are activated at least from time to time, also when the vehicle is parked, in order to execute monitoring functions or to collect information in advance for the driver, for example traffic messages.

DE 197 04 862 describes a system in which a suitable choice of signal and wake-up levels enables the formation of a sub-system between a number of stations in a bus system; some of the stations then communicate with one another while the other stations of the bus system are in the quiescent state. The complete system is awakened by means of a given wake-up level which is clearly distinct from the normal signal levels, i.e. all stations then change over from the quiescent state to the normal operating state. Subsequently, the participants in the sub-system are identified and the stations that are not concerned return to the quiescent state.

This solution has the drawback that, as before, all stations assume the normal operating state at least once at the beginning of each communication phase of a sub-system. Consequently, the power consumption is not significantly reduced, particularly if the communication is frequent and short. Because the non-participating stations are in the quiescent state, the transceiver does not prepare the necessary quiescent voltage level, so that the transmission properties of the overall system are affected.

SUMMARY OF THE INVENTION

It is an object of the invention to realize a sub-network mode of operation in which the power consumption is reduced and which decouples the functionality of the transmission system from the functionality of the microcontroller.

This object is achieved according to the invention in that at least one station is arranged to switch over from a quiescent state to a standby state in response to the reception of a first wake-up signal, and that selected stations are switched to a normal operating state upon reception of a second wake-up signal for the selection of stations.

Bus systems include a plurality of stations, the individual stations being capable of executing different functions. However, the execution of sub-functions does not require complete functionality of all the stations connected to the bus system. The stations are connected to one another via a system of conductors and include a control unit in addition to a transceiver.

In order to realize a sub-system, all stations connected to the bus systems are first switched from a quiescent state to a standby state by means of a first wake-up signal or first wake-up request transmitted via the system of conductors. In the quiescent mode the stations are currentless and their power consumption is extremely low. The stations include a receiver which is accommodated in the transceiver and has all features necessary to receive a first wake-up signal. After reception of the first wake-up signal, the stations are switched to a standby state. The power consumption in the standby state is slightly higher than that in the quiescent state, but the station performs all duties that have to be done at least so as to enable unrestricted communication by other stations. The power consumption, however, is far less than that in the normal operating state. Moreover, in this standby state the station is capable of unambiguously detecting a second wake-up signal or wake-up request intended for this station. After identification of the second wake-up signal, the control unit sets the selected station to the normal operating state. Because usually several individual stations communicate with one another in order to execute sub-functions, the second wake-up signal is transmitted to all stations required for the execution of a sub-function. Due to this second wake-up signal and the switching over of the selected stations to the normal operating state a sub-system is established for the execution of a sub-function. Stations that are not required for the execution of the relevant sub-function remain in the standby state.

The control unit of the station includes a microcontroller and a protocol controller. The microcontroller executes application-specific tasks and the protocol controller is responsible for the execution of a specified transmission protocol.

It has been found that the transceiver is advantageously arranged to receive the first wake-up signal as well as the second wake-up signal. For the reception of the first wake-up signal the transceiver includes a receiver which is also capable of detecting a first wake-up request in the quiescent state; after the reception of this first wake-up signal the station is switched from the quiescent state to the standby state by the transceiver. In this standby state the transceiver can recognize a second wake-up signal which is applied directly to the relevant station so as to select this station. It is only when the transceiver has recognized that its station has been selected that it informs the control unit which then switches the complete station to its normal operating state. The other stations, not being required for the sub-function, remain in the standby state. When the communication between the stations in the normal operating state is terminated, these stations are switched to the standby state by their respective control unit. The transceiver keeps the stations which just were in the normal operating state and the stations which were also in the standby state during the communication in the standby state until, for example no communication has taken place on the entire bus system for a predetermined period of time. This results in an optimum saving of power. The decoupling of the responsibilities between transceiver and control unit at the same time enhances the availability of the overall bus system. Stations in which faults occur in the control unit because of, for example software errors, thus cannot influence the communication and the availability of the overall bus system because, even in the case of incorrect operation of the control unit, the transceiver performs all duties required to enable unimpeded communication by all other stations.

In a further embodiment of the invention the first wake-up signal is generated, for example by a locally wakened station. Because the individual stations execute different functions, they also have different components. For example, a station could be locally wakened via an internal clock so as to measure the ambient temperatures for the purpose of preheating of the vehicle. Moreover, for the reception of traffic messages a station could be locally wakened by a received traffic radio transmission symbol in order to collect traffic messages which are then presented to the driver in a route-specific fashion when the drive commences.

When a station is wakened by such external influence, it is switched directly to its normal operating state by its control unit. In this state the station can transmit the first wake-up signal to all stations via the bus system. In response thereto all stations are set to their standby state by their transceivers. The locally wakened station then applies second wake-up signals to all stations required for the current sub-function to be executed. This local wake-up function and the autonomous dispatch of wake-up signals enable a decentralized configuration of the bus system for the execution of sub-functions and for the formation of a sub-system, so that a significant amount of energy is saved again.

In a preferred further embodiment of the bus system the station is arranged so as to be in a quiescent state with switched-on regulated voltage supply. Stations may be in this quiescent state with switched-on regulated voltage supply when they execute local sub-functions or await the reception of data. In such a case the transceiver switches the station to the standby state with switched-on regulated voltage supply upon reception of the first wake-up signal. After reception of the second wake-up signal the transceiver triggers a warm start in that it applies an interrupt to the control unit. The control unit switches the station to the normal operating state.

In order to achieve a further reduction of the power consumption, stations are arranged to operate in a quiescent state with switched-off regulated voltage supply. To this end, the transceiver of each station keeps a receiver ready which operates with a non-regulated voltage. This receiver is arranged to receive only the first wake-up signal or a local wake-up signal which is initiated by a switch or a control signal. After the reception of such a wake-up signal, the transceiver switches the station to the standby state with switched-off regulated voltage supply. The station then operates with a non-regulated voltage. When the station is then selected by the second wake-up signal, the transceiver switches on the regulated voltage supply, via a control signal, and hence switches the station to the normal operating state. This distinction enables a further saving of power.

Furthermore, the object of the invention is also achieved by a station in a bus system with a transceiver and a control unit in that the transceiver is arranged to switch over the station from a quiescent state to a standby state after the reception of a first wake-up signal, and that, after reception of a second wake-up signal whereby the station is selected, the station is switched to a normal operating state by the control unit.

BRIEF DESCRIPTION OF THE DRAWING

An embodiment of the invention will be described in detail hereinafter with reference to the drawings. Therein.

DESCRIPTION OF THE PREFERRED EMBODIMENT

Figure 1:
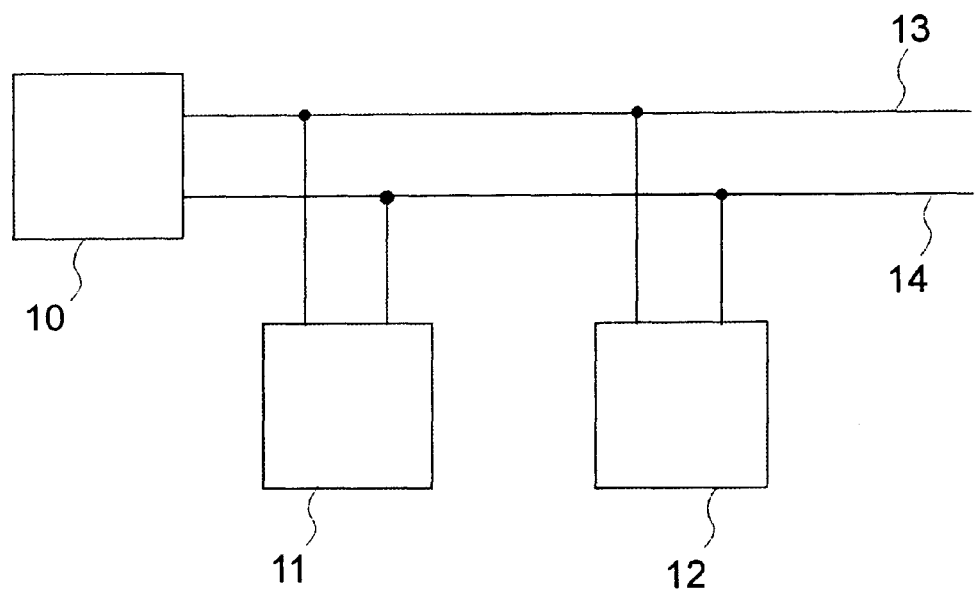
FIG. 1 shows diagrammatically the construction of a bus system.

FIG. 1 shows a bus system according to the invention, for example a bus system of the type used for automotive electronics. The stations 10, 11, 12 communicate, in conformity with a given protocol, via a differential bus which is represented as a system of conductors 13 and 14. However, a system with a larger number of conductors is also feasible. Data is transmitted between the stations 10, 11, 12 via the conductors 13 and 14. The stations 10, 11, 12 are accommodated, for example in a vehicle and perform a wide variety of functions.

Figure 2:
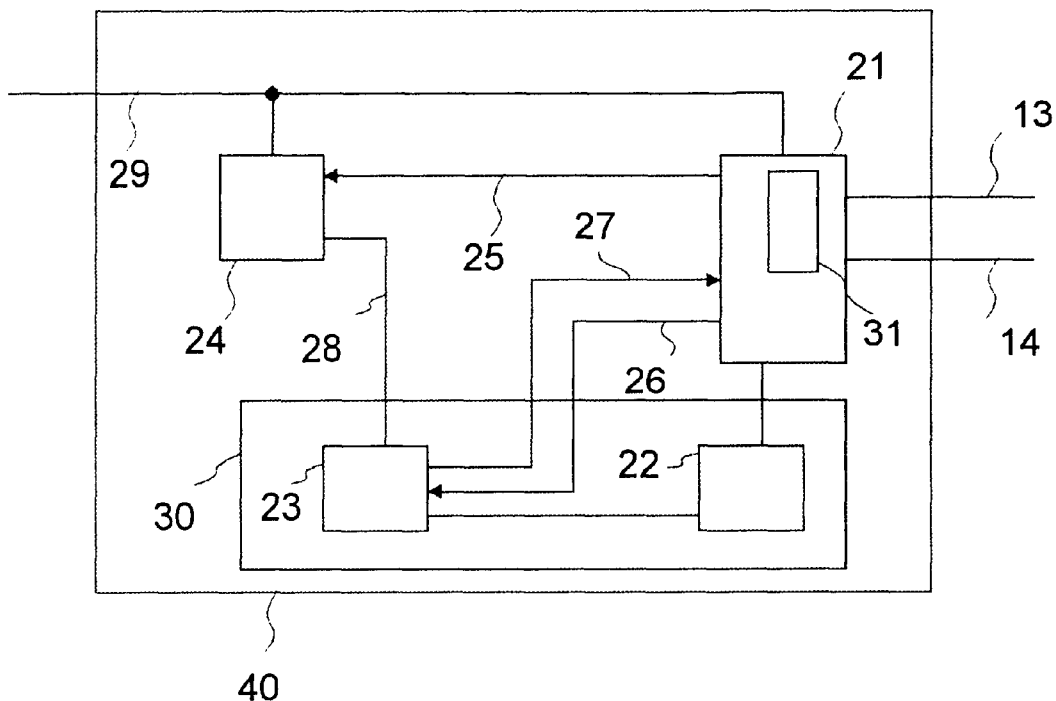
FIG. 2 shows diagrammatically the construction of a station.

FIG. 2 shows the construction of a station 40 which is denoted by the reference numerals 10, 11, 12 in FIG. 1. Each station 40 includes a transceiver 21 for the transmission and reception of signals via the system of conductors 13 and 14; such a transceiver includes a receiver 31 for the reception of first wake-up signals. Each station 40 also includes a control unit 30 with a protocol controller 22 for the execution of a specified transmission protocol, for example CAN (Controller Area Network) and a microcontroller 23 for the execution of application-specific tasks. The station 40 also includes a regulated voltage source 24 VCC. The non-regulated battery voltage 29 is applied to the regulated voltage source 24 on the one side and to the transceiver 21 on the other side.

Figure 3:
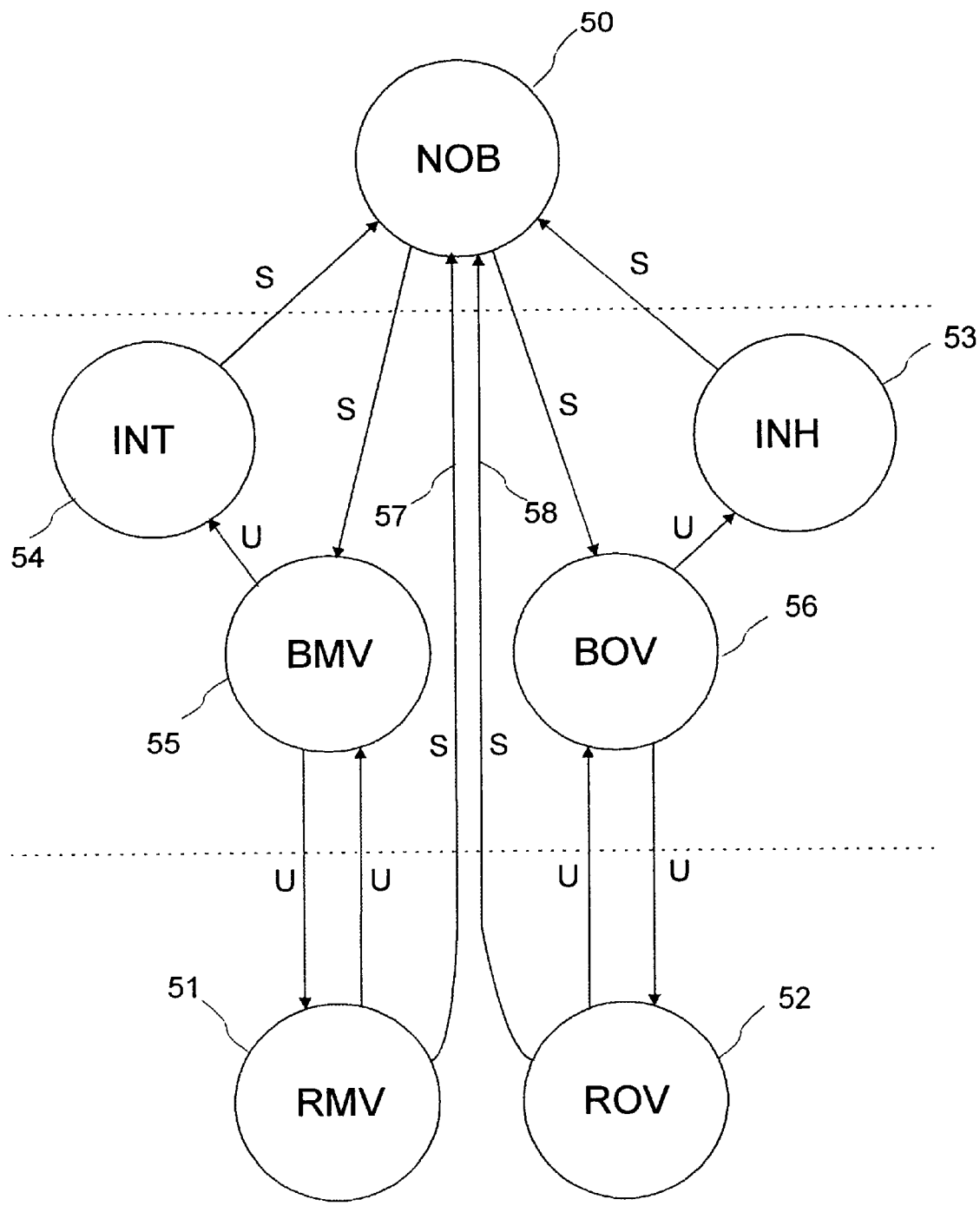
FIG. 3 shows a state transition diagram.

FIG. 3 shows the states that can be assumed by a station 40. The states 51 and 52 represent the quiescent state of the station 40. The power consumption is very low in the quiescent state and in this state only waking up by means of a first wake-up signal is possible. The quiescent state is subdivided into a state 51 with a switched-on regulated voltage source VCC (RMV). In the state 51 the station 40 is capable of executing local sub-functions. The receiver 31 then receives a regulated voltage. The control unit 30 is in a power-saving quiescent state. In order to make the power saving even more effective, the station 40 operates in a state 52 with a switched-off regulated voltage supply VCC (ROV). The receiver 31 operates with a non-regulated voltage 29 (VBAT) in the state 52. All further components of the stations are in the power-saving quiescent state. The receiver 31 can receive a first wake-up signal in both quiescent states 51 and 52. After the reception of a first wake-up signal, via the receiver 31 in the transceiver 21, the transceiver 21 sets the station 40 to one of the standby states 55 or 56.

The standby state is also subdivided: a state 55 with switched-on VCC (BMV) and a state 56 with switched-off VCC (BOV). In the standby state the power consumption is low and a second wake-up signal for waking up a selected station 40 can be detected. Moreover, the transceiver 21 provides all quiescent voltage levels and impedances required to enable communication between other stations 40 of the bus system. In the state 55 with switched-on VCC (BMV) the transceiver 21 initiates, after reception of a second wake-up signal, an interrupt on the lead 26; this interrupt triggers a warm start INT 54 of the station 40. Upon reception of the interrupt on the lead 26 the control unit 30 switches the station 40 to the normal operating state 50.

In the state 56 with switched-off VCC (BOV) the transceiver 21 initiates, after reception of a second wake-up signal for its station 40, a cold start INH 53 of the station 40, by way of a control signal on the lead 25, in that it directly switches on the regulated voltage source VCC 24 and hence switches the station 40 to the normal operating state 50 under the control of the microcontroller 23 in the control unit 30.

In the normal operating state 50 the power consumption is not reduced and unrestricted communication is possible. The stations 40 reach the normal operating state 50 only under the control of the microcontroller 23 in the control unit 30. The stations 40 are switched from the normal operating state 50 to the standby state 55 or 56 in an application-specific manner by the microcontroller 23.

The transitions between standby states and quiescent states are controlled exclusively by the transceiver 21. It is thus achieved that the stations 40 remain in the standby state for as long as communication takes place on the bus, so that the transmission reliability of the entire bus system is ensured. It is only after given criteria have been satisfied, for example that no communication has taken place after expiration of a period of time, that the stations 40 are switched to the power-saving quiescent state by their transceivers 21.

The decoupled power supply and responsibility of the microcontroller 23 and the transceiver 21 offers a further advantage. The availability of the entire bus system is thus enhanced. The transceiver 21 can autonomously ensure the availability of the bus system, irrespective of the fact whether the microcontroller 23 operates or is correctly powered or not. When a microcontroller 23 does not appropriately drive the transceiver 21 via the lead 27, the transceiver 21 remains in the standby or quiescent state, depending on the requirements of the bus, the communication is not restricted and the saving of power is optimum. The availability is enhanced already when only a two-stage method is used, so also in the absence of the selective wakening by the second wake-up signals.

The reduction of the power consumption will now be elucidated on the basis of a simple example. In a bus system with 30 stations a routine of 100 ms should be executed every five minutes while the vehicle is parked. The customary power consumption per station nowadays is approximately 50 $\mu$A in the quiescent state without VCC and approximately 100 mA in the normal operating state. Whereas the resultant mean power consumption of a contemporary bus system overall amounts to approximately 2.5 mA, in the case of sub-net operation it amounts to approximately 1.568 mA (the standby state requires approximately 200 $\mu$A per station), so only slightly higher than the quiescent state current of 1.5 mA to be provided anyway. If the power consumption increases beyond 50 mA because of the multitude of routines desired nowadays, it can be kept in the range of the quiescent current of a few mA by way of appropriate sub-net formation. This is very important for the charge of the starter battery after the vehicle has been parked for weeks, and hence also for the availability of the vehicle.

What is claimed is:

1. A bus system comprising; a plurality of stations which are coupled to one another via a system of conductors and each of said stations includes a transceiver and a control unit, characterized in that at least one station is arranged to switch over from a quiescent state to a standby state in response to the reception of a first wake-up signal, and that selected stations are switched to a normal operating state upon reception of a second wake-up signal for the selection of stations.

2. A bus system as claimed in claim 1, characterized in that the transceiver is arranged to receive the first and the second wake-up signal in the station, which transceiver informs its control unit only when the second wake-up signal selects its station, and the control unit switches the station from the standby state to the normal operating state.

3. A bus system as claimed in claim 1, characterized in that the transceiver includes a receiver for the reception of wake-up signals in the quiescent state of its station and controls the switching over from the quiescent state to the standby state.

4. A bus system as claimed in claim 1, characterized in that in switching over from the normal operating state to the quiescent state the control unit switches the station to the standby state and the transceiver switches the station to the quiescent state after certain conditions have been satisfied.

5. A bus system as claimed in claim 1, characterized in that in the case of locally wakened stations, the control unit switches the station directly to the normal operating state in order to apply wake-up signals to other stations of the bus system.

6. A bus system as claimed in claim 1, characterized in that the transceiver switches the station from a quiescent state with a switched-on regulated voltage supply to a standby state with a switched-on regulated voltage supply, and after reception of the second wake-up signal the transceiver initiates a warm start of the station in that it dispatches an interrupt to the station control unit in order to switch the station to the normal operating state.

7. A bus system as claimed in claim 1, characterized in that the transceiver switches the station from a quiescent state with a switched-off regulated voltage supply to a standby state with a switched-off regulated voltage supply, and after reception of the second wake-up signal the transceiver initiates a cold start of the station in that it switches on the regulated voltage supply by means of a control signal and switches the station to the normal operating state.

8. A bus system as claimed in claim 1, characterized in that the transceiver operates with a non-regulated voltage in the quiescent state and with a switched-off regulated voltage supply.

9. A bus system as claimed in claim 1, characterized in that the control unit includes an application-controlled microcontroller and a protocol controller.

10. A station for use in a bus system, the station comprising; a transceiver and a control unit, characterized in that the transceiver is arranged to switch over from a quiescent state to a standby state after reception of a first wake-up signal, and that the station is switched to a normal operating state by the control unit upon reception of a second wake-up signal for the selection of the station.

11. A station device for communication with other station devices via a bus system, said station device comprising:
a transceiver coupled to the bus system, the transceiver including means responsive to a first wake-up signal for switching over the station device from a quiescent state to a standby state, and
a control unit for switching over the station device from the standby state to a normal operating state in response to a second wake-up signal indicating selection of the station device.

12. The station device as claimed in claim 11 wherein the transceiver receives the first and second wake-up signals and triggers its control unit into operation only if the second wake-up signal selects its station device, whereupon the control unit switches over the station device from the standby state to the normal operating state.

13. The station device as claimed in claim 12 wherein the control unit includes means for switching over its (selected) station device from a normal operating state to its standby state, and
only the transceiver controls the switch over of the station device from the standby state to the quiescent state.

14. The station device as claimed in claim 12 wherein the station device is switched over from the standby state to the normal operating state only under control of the control unit.

15. The station device as claimed in claim 11 wherein, in the standby state, the power consumption of the station device is only slightly higher than it is in the quiescent state thereof.

16. The station device as claimed in claim 11 wherein, in the quiescent state, the station device includes a switched-on regulated voltage supply, and in response to the first wake-up signal, the transceiver switches over the station device to a standby state with a switched-on regulated voltage supply, and in response to the second wake-up signal, the transceiver, if selected, initiates a warm start of the station device by a signal to its control unit which switches over the station device to the normal operating state.

17. The station device as claimed in claim 11 wherein, in the quiescent state, the station device includes a switched-off regulated voltage supply, and in response to the first wake-up signal, the transceiver switches over the station device to a standby state with a switched-off regulated voltage supply, and in response to the second wake-up signal, the transceiver, if selected, initiates a cold start of the station device by a control signal for switching on the regulated voltage supply, and the control unit then switches over the station device to the normal operating state.

18. The station device as claimed in claim 11 which further comprises a regulated voltage supply and a supply terminal for connection to a source of non-regulated voltage, and in the quiescent state of the station device the regulated voltage supply is switched off and the transceiver operates from a non-regulated voltage at said supply terminal.

19. The station device as claimed in claim 11 further comprising a regulated voltage supply which is switched on under the control of the transceiver, and the control unit receives its operating voltage from the regulated voltage supply.

20. The station device as claimed in claim 11 wherein, if the second wake-up signal indicates that the station device is non-selected, the station device remains in the standby state at least until selected station devices on the bus system complete their assigned normal operating functions.

21. The station device as claimed in claim 11 wherein the switch over of the station device from the quiescent state to the standby state and vice versa is controlled exclusively by the transceiver.

22. The station device as claimed in claim 11 wherein the control unit includes means for switching over its (selected) station device from a normal operating state to a standby state, and only the transceiver controls the switch over of the station device from the standby state to the quiescent state.

23. The station device as claimed in claim 11 wherein, for a station device locally wakened by a first wake-up signal, its control unit switches over the station device directly to the normal operating state whereby the station device can apply wake-up signals to other station devices via the bus system.

24. A method of operating one or more station devices arranged to communicate with one another via a bus system, the method comprising:

applying a first wake-up signal to the bus system that causes all station devices on the bus system to switch over from a quiescent state to a standby state, and applying a second wake-up signal to the bus system that causes certain selected station devices on the bus system to switch over from the standby state to a normal operating state.

25. The operating method as claimed in claim 24 wherein the station devices on the bus system each include a transceiver coupled to the bus system and a control unit, and wherein all station devices are switched over from the quiescent state to the standby state exclusively by their respective transceivers, and selected station devices are switched over from the standby state to the normal operating state exclusively by their respective control units.

26. The operating method as claimed in claim 24 wherein, in the standby state, the power consumption of the station device is only slightly higher than it is in the quiescent state thereof.

* * * * *